United States Patent
Sasai et al.

(10) Patent No.: US 6,392,770 B1
(45) Date of Patent: May 21, 2002

(54) MULTI-POINT OPTICAL TRANSMISSION SYSTEM

(75) Inventors: Hiroyuki Sasai, Katano; Kazuki Maeda, Neyagawa; Koichi Masuda, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/320,144

(22) Filed: May 26, 1999

(51) Int. Cl.[7] .............................................. H04J 14/08
(52) U.S. Cl. ..................... 359/136; 359/145; 359/167; 379/56.2
(58) Field of Search ................................ 359/136, 145, 359/125, 167; 379/56.1, 56.2, 56.3; 455/422

(56) References Cited

U.S. PATENT DOCUMENTS

| | | | |
|---|---|---|---|
| 5,424,864 A | 6/1995 | Emura | 359/173 |
| 5,675,613 A | * 10/1997 | Uwano et al. | 375/346 |
| 5,784,506 A | 7/1998 | Pfeiffer | 385/24 |

FOREIGN PATENT DOCUMENTS

| | | |
|---|---|---|
| EP | 0 845 878 | 6/1998 |
| JP | 07283787 | 10/1995 |
| WO | 99/07087 | 2/1999 |

OTHER PUBLICATIONS

Patent Abstracts of Japan, by Hamada Tomoichi, "Inter-Base Station Connecting Device", vol. 1999, No. 04, Apr. 30, 1999 & JP 11 027739 A (Mitsubishi Electric Corp), Jan. 29, 1999.

* cited by examiner

Primary Examiner—Kinfe-Michael Negash
(74) Attorney, Agent, or Firm—Wenderoth, Lind & Ponack, L.L.P.

(57) ABSTRACT

Radio base stations subject each code-division multiplex signal to frequency conversion so as to vary each frequency thereof according to the radio base stations and then converts the signal to an optical signal before transmitting the same to a switching station. The switching station multiplexes the optical signals, subjects a signal obtained after multiplexing to optical-electrical conversion, and extracts the code-division multiplex signal from the respective electrical signal obtained after the conversion. Consequently, each signal to be demodulated by demodulating sections includes nothing but the code-division multiplex signal outputted from the radio base stations. Therefore, a code-division multiplex signal outputted from a desired base station is not disturbed by code-division multiplex signals outputted from the other stations as a noise as will be in a conventional system.

5 Claims, 6 Drawing Sheets

(a)     (b)

MULTI-POINT OPTICAL TRANSMISSION SYSTEM

BACKGROUND OF THE INVENTION

1. Field of the Invention

The present invention relates to optical transmission systems, more particularly to a multi-point optical transmission system for optically transmitting code-division multiplex signals in an analog fashion from a plurality of slave stations to a master station through an optical fiber.

2. Description of the Background Art

FIG. 4 is a block diagram showing an exemplary functional configuration of a conventional multi-point optical transmission system.

The system in FIG. 4 includes radio base stations $40_1$ to $40_n$ (where n is an arbitrary integer of 2 or more) and a switching station 41, and each of the radio base stations $40_1$ to $40_n$ is connected to the switching station 41 via an optical fiber 43. Each radio base station $40_1$ to $40_n$ includes an antenna 401, a driving section 402, and an uplink electrical-optical converting section 403. The switching station 41 includes uplink optical-electrical converting sections $411_1$ to $411_n$, demodulating sections $412_1$ to $412_n$, and a switching section 413.

The antenna 401 receives an uplink radio signal. The uplink radio signal herein is a code-division multiplex signal into which radio signals outputted from a plurality of terminals (not shown) in each cell 42 are multiplexed in a code-division system. Each uplink radio signal is equal in frequency as predetermined. The driving section 402 applies a bias to the uplink radio signal. The uplink electrical-optical converting section 403 converts the uplink radio signal into an optical signal whose intensity is modulated by the uplink radio signal. The uplink optical-electrical converting sections $411_1$ to $411_n$ convert the optical signal into an electrical signal (an uplink radio signal). The demodulating sections $412_1$ to $412_n$ demodulate the uplink radio signal outputted from the radio base stations $40_1$ to $40_n$ to base band digital data (Note that a process of demodulation herein includes "reverse diffusions". Specifically, a radio signal is subjected to reverse diffusion before demodulation so as to obtain base band digital data; the same is applicable to the description below). The switching section 413 goes through a switching process in accordance with the base band digital data.

The operation whereby the system in FIG. 4 optically transmits a plurality of uplink radio signals outputted from the radio base stations $40_1$ to $40_n$ to the switching station 41 in a multi-point fashion is described next below. Each cell 42 in the system in FIG. 4 includes a plurality of terminals (not shown), and each of the terminals transmits a radio signal in a code-division multiplex system to one of the radio base stations $40_1$ to $40_n$ located in the same cell 42. Thereafter, each of the uplink radio signals obtained after the code-division multiplexing of radio signals from the terminals is then received by the antenna 401 of the respective radio base stations $40_1$ to $40_n$.

The received uplink radio signals are respectively biased in the driving section 402, and sent to the uplink electrical-optical converting section 403. In response thereto, the uplink electrical-optical converting section 403 outputs an optical signal whose intensity is modulated by the uplink radio signal. In this manner, each optical signal outputted from the radio base stations $40_1$ to $40_n$ is transmitted to the switching station 41 through the optical fiber 43. Each of the transmitted optical signals is subjected to optical-electrical conversion in the uplink optical-electrical converting sections $411_1$ to $411_n$. Each electrical signal obtained after the conversion (uplink electrical signals outputted from the radio base stations $40_1$ to $40_n$) is demodulated to base band digital data in the demodulating sections $412_1$ to $412_n$, and then sent to the switching section 413. The switching section 413 goes through a switching process in accordance with the respective base band digital data.

As will be known from the above, a plurality of uplink radio signals outputted from the radio base stations $40_1$ to $40_n$ can be optically transmitted in a multi-point fashion to the switching station 41 in the system in FIG. 4.

The system, however, necessitates the uplink optical-electrical converting sections $411_1$ to $411_n$ as many as the radio base stations $40_1$ to $40_n$ in the switching station 41. Consequently, if the system has a large number of cells 42, the switching station 41 accordingly becomes larger and costs more.

Thus, another type of multi-point optical transmission system was proposed, in which, with only a single optical-electrical converting section provided in a switching station, uplink radio signals outputted from a plurality of radio base stations are optically transmitted to the switching station in a multi-point fashion.

FIG. 5 is a block diagram showing an exemplary configuration of another conventional multi-point optical transmission system.

The system in FIG. 5 includes radio base stations $50_1$ to $50_n$ (where n is an arbitrary integer of 2 or more) and a switching station 51, and each of the radio base stations $50_1$ to $50_n$ is connected to the switching station 51 via an optical fiber 53. Each of the radio base stations $50_1$ to $50_n$ includes an antenna 501, a driving section 502, and an uplink electrical-optical converting section 503. The switching station 51 includes an optical multiplexing section 511, uplink optical-electrical converting section 512, a branching section 513, demodulating sections $514_1$ to $514_n$, and a switching section 515.

The optical multiplexing section 511 multiplexes optical signals outputted from the radio base stations $50_1$ to $50_n$. The uplink optical-electrical converting section 512 converts an optical signal obtained by multiplexing into an electrical signal. The branching section 513 branches the electrical signal into n signals. Other components in this system perform each task in a similar manner to those in the system in FIG. 4.

The operation whereby the system in FIG. 5 optically transmits a plurality of uplink radio signals outputted from the radio base stations $50_1$ to $50_n$ in a multi-point fashion to the switching station 51 is described next below.

Referring to FIG. 5, each cell 52 in the system includes a plurality of terminals (not shown), and each of the terminals transmits a radio signal in a code-division multiplex system to one of the radio base stations $50_1$ to $50_n$ located in the same cell 52. Each of the radio signals obtained after the code-division multiplexing is then received by the antenna 501 of the respective radio base stations $50_1$ to $50_n$. The received uplink radio signals are respectively biased in the driving section 502, and then sent to the uplink electrical-optical converting section 503. In response thereto, the uplink electrical-optical converting section 503 outputs an optical signal whose intensity is modulated by the uplink radio signal.

In this manner, each of the optical signals outputted from the base radio stations $50_1$ to $50_n$ is transmitted to the switching station 51 through the optical fiber 53. The transmitted optical signals are multiplexed in the optical multiplexing section 511, and a signal obtained by multiplexing is then subjected to optical-electrical conversion in the uplink optical-electrical converting section 512. An electrical signal obtained by the conversion is branched into n signals in the branching section 513. The respective electrical signals obtained by n-branching are inputted to the demodulating sections $514_1$ to $514_n$, and the uplink radio signals outputted from the radio base stations $50_1$ to $50_n$ are selectively demodulated to base band digital data therein. The base band digital data is then respectively sent to the switching section 515, and a switching process is performed therein in accordance with the respective base digital data.

As will be known from the above, unlike the system in FIG. 4, the system in FIG. 5 having only a single uplink optical-electrical converting section 512 in the switching station 51 can optically transmit a plurality of uplink radio signals outputted from the radio base stations $50_1$ to $50_n$ in a multi-point fashion to the switching station 51.

The system, however, causes a problem when demodulating the respective electrical signals obtained by n-branching to base band digital data in the demodulating sections $514_1$ to $514_n$. That is, as the electrical signals obtained by n-branching each include a plurality of uplink radio signals outputted from the radio base stations $50_1$ to $50_n$, the uplink radio signals disturb, for example, a signal obtained after reverse diffusion (corresponds to an uplink radio signal outputted from the radio base station $50_1$) as a noise when demodulation is taken place in the demodulating section $514_1$, thereby causing a drop in a C/N ratio.

For reference purposes, FIGS. 6a and 6b show two spectrums of a signal before and after the reverse diffusion taken place in the demodulating section $514_1$. FIG. 6a shows a spectrum before reverse diffusion, and FIG. 6b shows a spectrum after reverse diffusion. As shown in FIG. 6, an uplink radio signal 61 is subjected to reverse diffusion in the demodulating section $514_1$ but not the other two uplink radio signals 62 and 63. In this case, non-reverse-diffused uplink radio signals 62 and 63 disturb a signal 61A obtained by the reverse diffusion as a noise.

SUMMARY OF THE INVENTION

Therefore, an objective of the present invention is to provide a multi-point optical transmission system, in which, with only a single uplink optical-electrical converting section provided in a master station, code-division multiplex signals outputted from a plurality of slave stations are optically transmitted to the master station in a multi-point manner without a drop in each C/N ratio thereof.

The present invention has the following features to attain the objective above.

A first aspect of the present invention is directed to a multi-point optical transmission system for optically transmitting code-division multiplex signals from a plurality of slave stations to a master station, the slave stations having each varied carrier frequency assigned, each of the slave stations comprising:

frequency conversion means for subjecting each code-division multiplex signal to be transmitted to the master station to frequency conversion to equalize the predetermined frequency thereof with the carrier frequency assigned to one own station;

drive means for applying a bias to a signal obtained after the conversion by the frequency conversion means; and electrical-optical conversion means for converting an electrical signal obtained through the bias applied by the drive means into an optical signal whose intensity is modulated by the electrical signal, and the master station comprising:

optical multiplex means for multiplexing optical signals obtained after conversion by the electrical-optical conversion means;

optical-electrical conversion means for converting an optical signal obtained after multiplexing by the optical multiplex means into an electrical signal;

band pass filter means for extracting a signal equal in frequency to the carrier frequency assigned to each of the slave stations from the electrical signal obtained after conversion by the optical-electrical conversion means; and frequency re-conversion means for subjecting each signal extracted by the band pass filter means to frequency re-conversion to equalize each frequency thereof with a predetermined frequency.

As described above, in the first aspect of the present invention, each signal to be demodulated by the demodulation means includes only a code-division multiplex signal outputted from a single slave station. Accordingly, a code-division multiplex signal outputted from a desired base station will not be disturbed by code-division multiplex signals outputted from the other stations as a noise any more. Therefore, with only a single optical-electrical conversion means provided in the master station, the multi-point optical transmission system of the present invention can successfully optically transmit code-division multiplex signals outputted from a plurality of slave stations to a master station in a multi-point fashion without causing a drop in each C/N ratio thereof.

A second aspect of the present invention is directed to the multi-point optical transmission system as set forth in the first aspect of the invention, wherein each of the slave stations has varied downlink carrier frequency further assigned, the master station further comprises:

downlink frequency conversion means for subjecting each downlink signal to be transmitted to the slave stations to frequency conversion to equalize the other predetermined frequency thereof with the downlink carrier frequency assigned to each of the slave station;

multiplex means for multiplexing downlink signals obtained after the conversion by the downlink frequency conversion means;

downlink drive means for applying a bias to a signal obtained after multiplexing by the multiplex means;

downlink electrical-optical conversion means for converting an electrical signal obtained through the bias applied by the downlink drive means into an optical signal whose intensity is modulated by the signal; and optical branch means for branching the optical signal obtained after conversion by the downlink electrical-optical conversion means, and each of the slave stations further comprises:

downlink optical-electrical conversion means for converting one of a plurality of optical signals obtained after branching by the optical branch means into an electrical signal;

downlink band pass filter means for extracting a signal equal in frequency to a downlink carrier frequency assigned to the own station from the electrical signal obtained after conversion by the downlink optical-electrical conversion means; and downlink frequency re-conversion means for subjecting the downlink signal extracted by the downlink band pass filter means to frequency re-conversion to equalize a frequency thereof with a frequency before the frequency conversion.

As described above, in the second aspect of the present invention, each downlink signal outputted from the master station can further be optically transmitted to the slave stations in a multi-point fashion without a drop in each C/N ratio thereof.

A third aspect of the present invention is directed to the multi-point optical transmission system as set forth in the second aspect of the invention, wherein each of the slave stations has varied pilot signal frequency further assigned, and further comprises pilot signal multiplex means for multiplexing a pilot signal having a pilot signal frequency assigned to the own station on a code-division multiplex signal to be transmitted to the master station, the master station further comprises downlink pilot signal multiplex means for multiplexing a downlink pilot signal on each downlink signal to be transmitted to the slave stations, the downlink pilot signal multiplex means examines the electrical signal obtained after conversion by the optical-electrical conversion means to measure power of the pilot signal, and then generates control information indicating a difference between a measured value and a predetermined threshold to apply the same as a modulation component to the downlink pilot signal to be multiplexed, the downlink band pass filter means further extracts the downlink pilot signal from the electrical signal obtained after the conversion by the downlink optical-electrical conversion means, and in accordance with the control information supplied to the downlink pilot signal extracted by the downlink band pass filter means, the drive means adjusts power of a bias to be applied so that power of the code-division multiplex signal at time of reaching the master station are equalized.

As described above, in the third aspect of the present invention, an amount of noise and distortion occurs in an optical transmission system is reduced by multiplexing a pilot signal into each code-division multiplex signal and a downlink pilot signal into each downlink signal. Moreover, the system of the present invention suppresses noise-to-noise (power thereof) variation occurred in each code-division multiplex signal by equalizing each power thereof at the time of reaching the master station. As a result, the transmission characteristic of the system is improved.

A fourth aspect of the present invention is directed to the multi-point optical transmission system as set forth in the third aspect of the invention, wherein when converting the electrical signal into the optical signal, the electrical-optical conversion means adjusts each optical modulation level of the optical signal to equalize the same.

As described above, in the fourth aspect of the present invention, the equalized power of the optical signals to be transmitted to the optical-electrical conversion means prevents a noise having a relative intensity from occurring only to a particular code-division multiplex signal. As a result, the transmission characteristic of the system is improved.

A fifth aspect of the present invention is directed to the multi-point optical transmission system as set forth in the third aspect of the invention, wherein each of the code-division multiplex signals is a signal into which a plurality of radio signals transmitted from a mobile station in each cell of the slave stations are code-division-multiplexed, each downlink signal is a signal into which a plurality of radio signals to be transmitted to the mobile station in the cell are multiplexed, and each of the slave stations further comprises:

an antenna for transmitting and receiving the radio signals to and from the mobile station located in one own cell; and a circulator for supplying an output from the antenna to the frequency conversion means and an output from the downlink frequency re-conversion means to the antenna.

As described above, in the fifth aspect of the present invention, the slave stations can respectively be downsized as the system does not require thereto to have two antennas for transmitting and receiving signals, respectively.

These and other objects, features, aspects and advantages of the present invention will become more apparent from the following detailed description of the present invention when taken in conjunction with the accompanying drawings.

DESCRIPTION OF THE PREFERRED EMBODIMENTS

The preferred embodiments of the present invention are described next below with reference to the accompanying drawings.

(First Embodiment)

Figure 1:
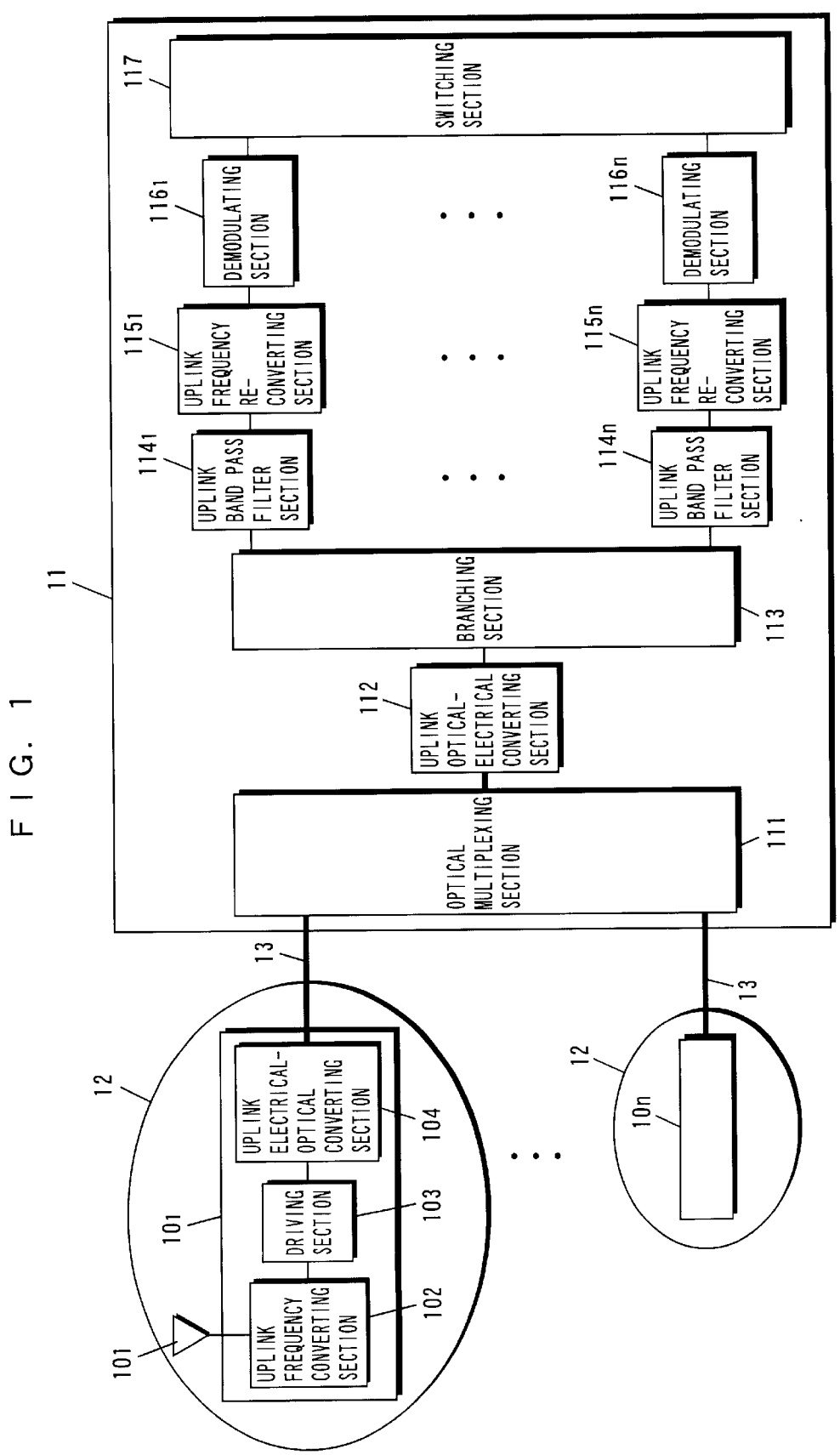
FIG. 1 is a block diagram showing a configuration of a multi-point optical transmission system according to a first embodiment of the present invention.

FIG. 1 is a block diagram showing the structure of a multi-point optical transmission system according to a first embodiment of the present invention.

The system in FIG. 1 comprises radio base stations 101 to $10_n$ (where n is an arbitrary integer of 2 or more) and a switching station 11, and each of the radio base stations $10_1$ to $10_n$ is connected to the switching station 11 via an optical fiber 13.

Each of the radio base stations $10_1$ to $10_n$ comprises an antenna 101, an uplink frequency converting section 102, a driving section 103, and an uplink electrical-optical converting section 104. The switching section 11 comprises an optical multiplexing section 111, an uplink optical-electrical converting section 112, a branching section 113, uplink band pass filter sections $114_1$ to $114_n$, uplink frequency re-converting sections $115_1$ to $115_n$, demodulating sections $116_1$ to $116_n$, and a switching section 117.

The antenna 101 receives an uplink radio signal. The uplink radio signal herein is a code-division multiplex signal into which radio signals outputted from a plurality of terminals not shown in each cell 12 are multiplexed in a code-division multiplex system. Each of the uplink radio signals is equal in frequency (f0) as predetermined.

It should be noted that the uplink radio signals are not necessarily equal in frequency. Herein, however, a description is made of a case where uplink radio signals are equal in frequency (f0) as is common for communication in a code-division multiplex system.

The radio base stations $10_1$ to $10_n$ are assigned with each varied frequency (f1 to fn), and each uplink frequency converting section 102 in the radio base stations $10_1$ to $10_n$ subjects the uplink radio signal to frequency conversion so as to equalize the frequency thereof with a frequency assigned to the own station. The driving section 103 applies a bias to the uplink radio signal. The uplink electrical-optical converting section 104 converts the uplink radio signal into an optical signal whose intensity is modulated by the uplink radio signal.

The optical multiplexing section 111 multiplexes the optical signals outputted respectively from the radio base stations $10_1$ to $10_n$. The uplink optical-electrical converting section 112 converts an optical signal obtained after multiplexing into an electrical signal. The branching section 113 branches the electrical signal into n signals. The uplink band pass filter sections $114_1$ to $114_n$ extract any uplink radio signal having frequency of f1 to fn from the electrical signal. The uplink frequency re-converting sections $115_1$ to $115_n$ subject the uplink radio signals having frequency of f1 to fn to frequency re-conversion so as to convert each frequency thereof back to the original value of f0. The demodulating sections $116_1$ to $116_n$ demodulate the uplink radio signals obtained after the re-conversion taken place in the uplink frequency re-converting sections $115_1$ to $115_n$ to base band digital data. The switching section 117 goes through a switching process in accordance with the respective base band digital data.

The operation whereby the system in FIG. 1 optically transmits a plurality of uplink radio signals outputted from the radio base stations $10_1$ to $10_n$ to the switching station 11 in a multi-point fashion is described next below.

Each cell 12 in the system in FIG. 1 includes a plurality of terminals (not shown), and each of the terminals transmits a radio signal in a code-division multiplex system to one of the radio base stations $10_1$ to $10_n$ located in the same cell 12. The radio signals outputted from the plurality of terminals are subjected to code-division multiplexing so as to obtain uplink radio signals. Each of the uplink radio signals is then received by the antenna 101 of each radio base station $10_1$ to $10_n$.

The received uplink radio signals each having a frequency of f0 are subjected to frequency conversion in each uplink frequency converting section 102 so that each frequency thereof is converted into a predetermined value (f1 to fn) according to the respective radio base stations $10_1$ to $10_n$.

The uplink radio signal obtained after the frequency conversion is biased in the driving section 103, and then sent to the uplink electrical-optical converting section 104. In response thereto, the uplink electrical-optical converting section 104 outputs an optical signal whose intensity is modulated by the uplink radio signal. In this manner, the respective optical signals outputted from the radio base stations $10_1$ to $10_n$ are transmitted to the switching station 11 via the optical fiber 13.

The transmitted optical signals are multiplexed in the optical multiplexing section 111, and then a resultant signal is subjected to optical-electrical conversion in the uplink optical-electrical converting section 112. The electrical signal obtained by conversion is branched into n signals in the branching section 113, and then sent to the band pass filters $114_1$ to $114_n$. The band pass filters $114_1$ to $114_n$ have a characteristic of selectively passing signals having frequency of f1 to fn. Therefore, uplink radio signals having frequency of f1 to fn are extracted from each electrical signal obtained after n-branching by each filter.

The extracted uplink radio signals are respectively subjected to frequency re-conversion in the uplink frequency re-converting sections $115_1$ to $115_n$ so that each frequency thereof is converted back to the original value of f0. Each uplink radio signal obtained after the re-conversion is demodulated to base band digital data in the demodulating sections $116_1$ to $116_n$, and sent to the switching section 117. Thereafter, the switching section 117 performs a switching process in accordance with the respective base band digital data.

As will be known from the above, in the system in FIG. 1, the radio base stations $10_1$ to $10_n$ subject each uplink radio signal having the predetermined frequency of f0 to frequency conversion so as to vary each frequency thereof according to the radio base stations $10_1$ to $10_n$ (f1 to fn), and then convert the uplink radio signals into optical signals before transmitting the same to the switching station 11. The switching station 11, on the other hand, multiplexes the optical signals outputted from the radio base stations $10_1$ to $10_n$, subjects a resultant optical signal to optical-electrical conversion, and extracts uplink radio signals respectively from the electrical signals obtained after the conversion. The switching station 11 then subjects the extracted uplink radio signals each having frequency of f1 to fn to frequency re-conversion so as to convert each frequency thereof back to the original value of f0, and then demodulates the same to base band digital data.

Figure 5:
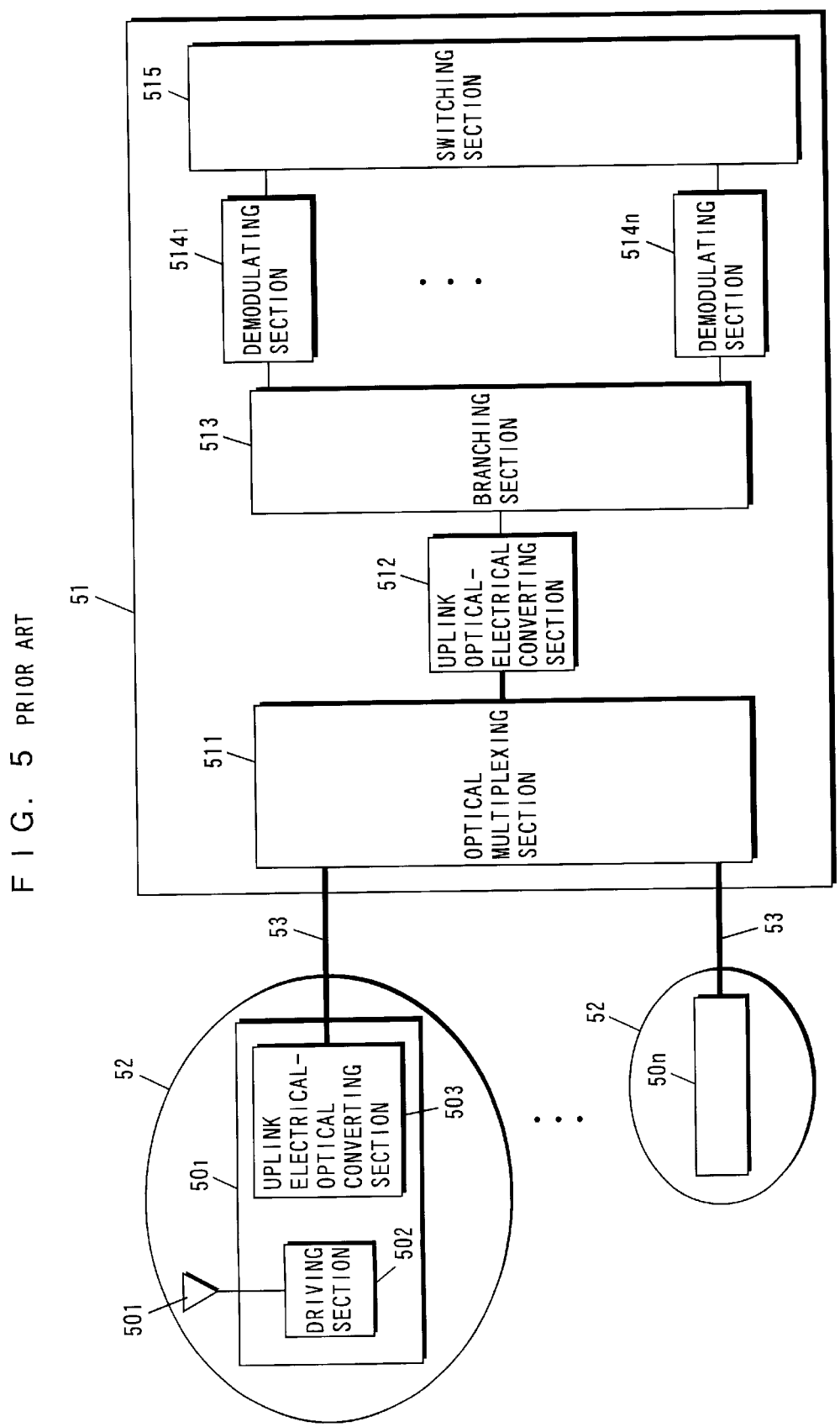
FIG. 5 is a block diagram showing an exemplary configuration of another conventional multi-point optical transmission system.
Figure 6:
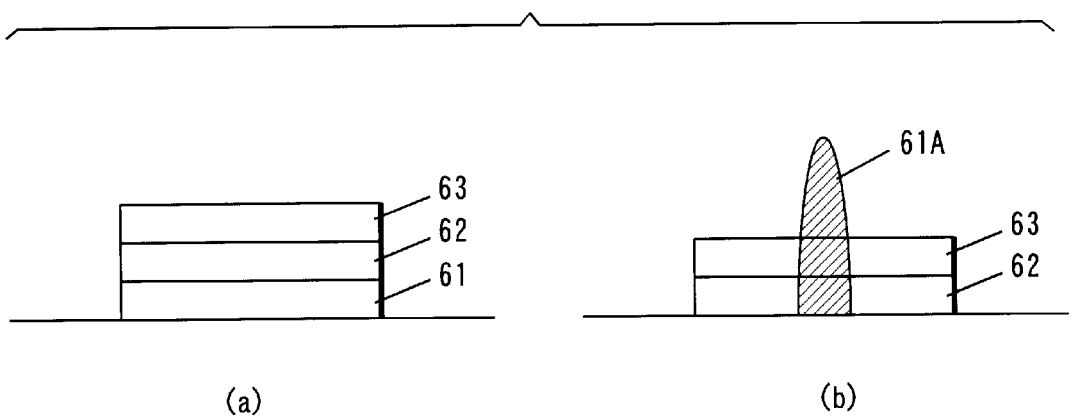
FIGS. 6a and 6b are diagrams showing exemplary spectrums of signals before and after reverse diffusion taken place in the demodulating sections $514_n$ in FIG. 5.

Specifically, the system in FIG. 1 allows each signal to be demodulated in the demodulating sections $116_1$ to $116_n$ to include nothing but an uplink radio signal outputted from the radio base stations $10_1$ to $10_n$. Accordingly, a code-division multiplex signal outputted from a desired base station will not be bothered by uplink radio signals outputted from the other stations as a noise as will be in the system in FIG. 5.

Thus, with only a single uplink optical-electrical converting section 112 provided in the switching station 11, a plurality of uplink radio signals outputted from the radio base stations $10_1$ to $10_n$ can be successfully optically transmitted to the switching station 11 in a multi-point manner without causing a drop in a C/N ratio thereof in the system in FIG. 1.

(Second Embodiment)

Figure 2:
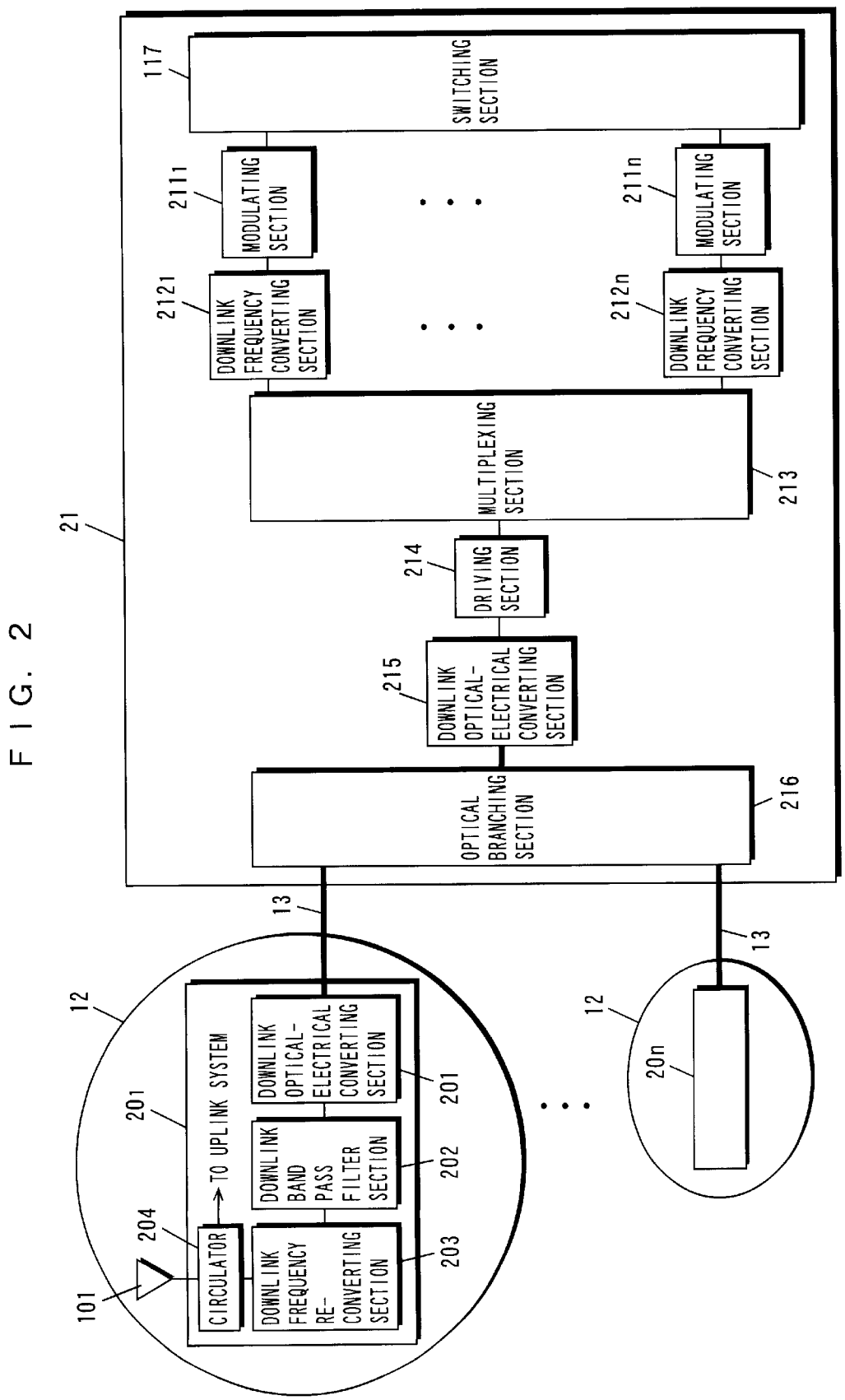
FIG. 2 is a block diagram showing a multi-point optical transmission system according to a second embodiment of the present invention.

FIG. 2 is a block diagram showing the structure of a multi-point optical transmission system according to a second embodiment of the present invention.

The system in FIG. 2 includes radio base stations $20_1$ to $20_n$ (where n is an arbitrary integer of 2 or more) and a switching station 21, and each of the radio base stations $20_1$ to $20_n$ is connected to the switching station 21 via an optical fiber 13.

The respective radio base stations $20_1$ to $20_n$ further includes a downlink optical-electrical converting section 201, a downlink band pass filter section 202, a downlink frequency re-converting section 203, and a circulator 204 in addition to the components included in the radio base stations $10_1$ to $10_n$ in FIG. 1 (Note that the components identical to those of the radio base stations $10_1$ to $10_n$ are not shown in this drawing).

The switching station 21 further includes modulating sections $211_1$ to $211_n$, downlink frequency converting sections $212_1$ to $212_n$, a multiplexing section 213, a driving section 214, a downlink electrical-optical converting section 215, and an optical branching section 216 in addition to the components included in the switching station 11 in FIG. 1 (Note that the components identical to those in the switching station 11 in FIG. 1 are not shown in this drawing except for the switching section 117).

The modulating sections $211_1$ to $211_n$ modulate each base band digital data to be transmitted to the radio base stations $201$ to $20_n$ in a code-division multiplex system. The downlink frequency converting sections $212_1$ to $212_n$ subject the downlink radio signals each having frequency of f0 obtained after the modulation to frequency conversion so as to vary each frequency thereof to be f1 to fn. The multiplexing section 213 multiplexes the downlink radio signals. The driving section 214 applies a bias to an electrical signal. The downlink electrical-optical converting section 215 outputs an optical signal whose intensity is modulated by the electrical signal. The branching section 215 branches the optical signal into n signals. The downlink optical-electrical conversion 201 converts the optical signal into an electrical signal. The respective downlink band pass filter sections 202 extract downlink uplink signals having frequency of f1 to fn from the electrical signal. The downlink frequency re-converting section 203 subjects the downlink radio signals having frequency of f1 to fn so as to convert each frequency thereof back to the original value of f0.

In the system shown in FIG. 2, an uplink radio signal received by the antenna 101 of the respective radio base stations $20_1$ to $20_n$ is inputted to an uplink system via the circulator 204. Specifically, the uplink radio signal is sent to a component corresponding to the uplink frequency converting section 102 in FIG. 1 so as to be optically transmitted to the switching station 21 in a multi-point fashion. As the way how the uplink radio signal is transmitted in the system is the same as in the above first embodiment, further description thereof is thus omitted below. The operation how downlink radio signals are optically transmitted from the switching station 21 to the radio base stations $20_1$ to $20_n$ in a multi-point fashion is described next below.

The respective base band digital data outputted from the switching section 117 to be transmitted to the radio base stations $20_1$ to $20_n$ is modulated in the modulating sections $211_1$ to $211_n$ in a code-division multiplex system. The respective downlink radio signals obtained by the modulation are equal in frequency (f0) and are subjected to frequency conversion in the downlink frequency converting sections $212_1$ to $212_n$ so that each frequency thereof is varied from f1 to fn.

It should be noted that the downlink radio signals outputted form the modulating sections $212_1$ to $212_n$ are not necessarily equal in frequency. Herein, however, a description is made of a case where downlink radio signals are equal in frequency (herein, f0) as is common for communication in a code-division multiplex system.

The downlink radio signals obtained by the frequency conversion are multiplexed in the multiplexing section 213, biased in the driving section 214, and then sent to the downlink electrical-optical converting section 215. In response thereto, the downlink electrical-optical converting section 215 outputs an optical signal whose intensity is modulated by the electrical signal.

The outputted optical signal is branched into n signals in the optical branching section 216, and the signals are then transmitted to the radio base stations $20_1$ to $20_n$ via the optical fiber 13. The transmitted optical signals are converted into electrical signals in each downlink optical-electrical converting section 201. As each band pass filter section 202 has a characteristic of selectively passing signals having frequency of f1 to fn, downlink radio signals each having frequency of f1 to fn are extracted from each electrical signal by each filter.

The extracted downlink radio signals each are subjected to frequency re-conversion so that each frequency thereof is converted back to the original value of f0. Thereafter, the signals are sent to the antenna 101 through the optical circulator 204 so as to be transmitted to a plurality of terminals (not shown) in each cell 12.

As will be known from the above, in the system in FIG. 2, the switching station 21 subjects the downlink radio signals each having the predetermined frequency of f0 to frequency conversion so as to vary each frequency thereof from f1 to fn, multiplexes the signals, and converts the electrical signal obtained after conversion into an optical signal before transmitting the same to the radio base stations $20_1$ to $20_n$.

On the other hand, each radio base station $20_1$ to $20_n$ subjects the optical signal outputted from the switching station 21 to electrical-optical conversion, and extracts its own downlink radio signal having frequency of f1 to fn from the electrical signal obtained by the conversion. Thereafter, each radio base station $20_1$ to $20_n$ subjects the extracted downlink radio signal is subjected to frequency re-conversion so as to convert the frequency thereof back to the original value of f0 before transmitting the radio signal to each terminal located in the same cell 12.

As will be known from the above, the system in FIG. 2 as well as the system in FIG. 1 can perform multi-point optical transmission with only a single uplink optical-electrical converting section 112 provided in the switching station 21 on a plurality of signals outputted from the radio base stations $20_1$ to $20_n$ to the switching station 21 without causing a drop in each C/N ratio thereof. Further, the system can optically transmit a plurality of downlink radio signals outputted from the switching station 21 to the radio base stations $20_1$ to $20_n$ in a multi-point manner without causing a drop in each C/N ratio thereof.

Note that the antenna for transmitting/receiving signals 101 and the circulator 204 provided in the radio base stations $20_1$ to $20_n$ in the system in FIG. 2 can be substituted with two antenna s for transmitting and receiving signals, respectively. In that case, however, the size of the radio base stations $20_1$ to $20_n$ will be larger.

(Third Embodiment)

Figure 3:
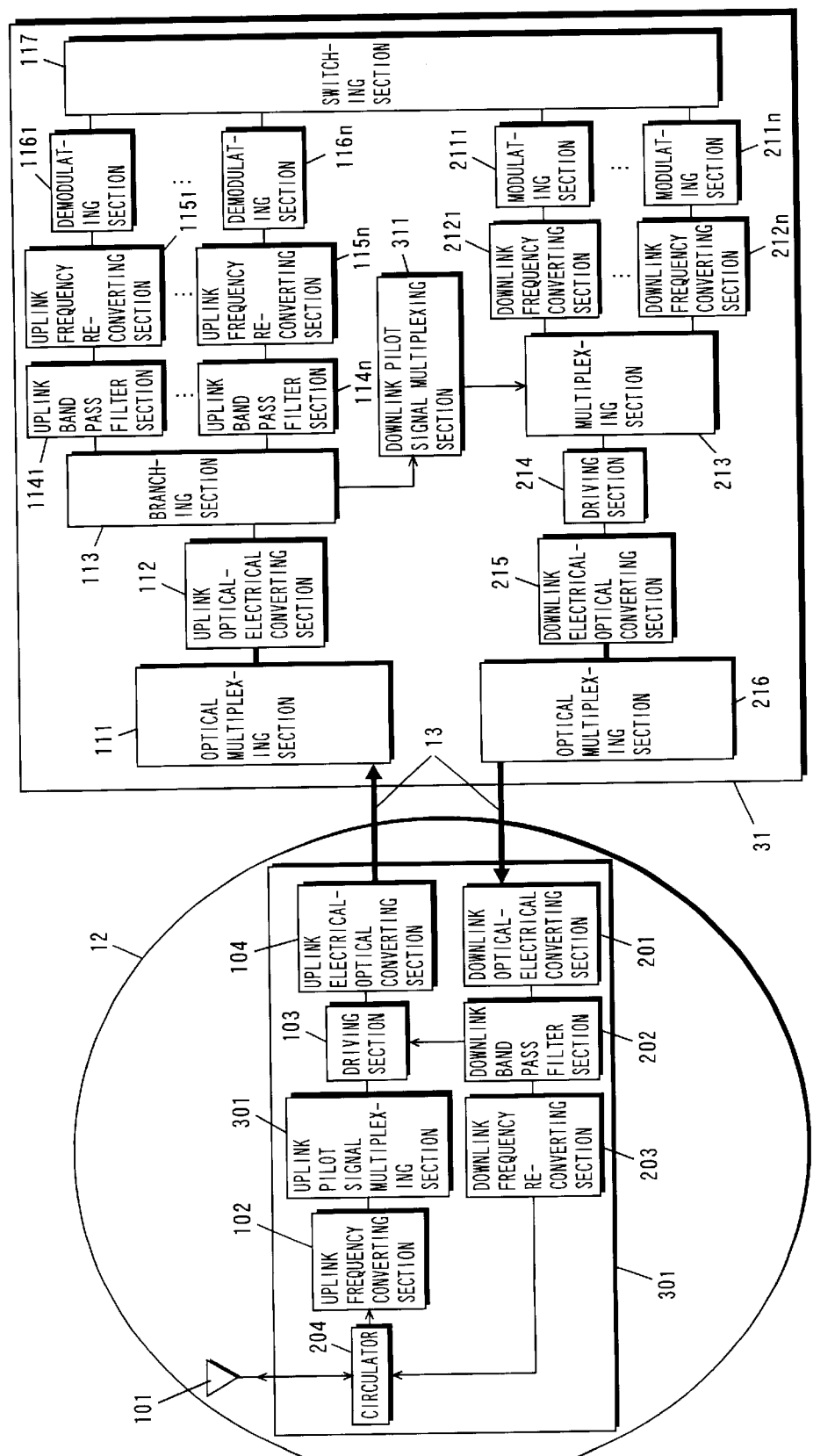
FIG. 3 is a block diagram showing a configuration of a multi-point optical transmission system according to a third embodiment of the present invention.
Figure 4:
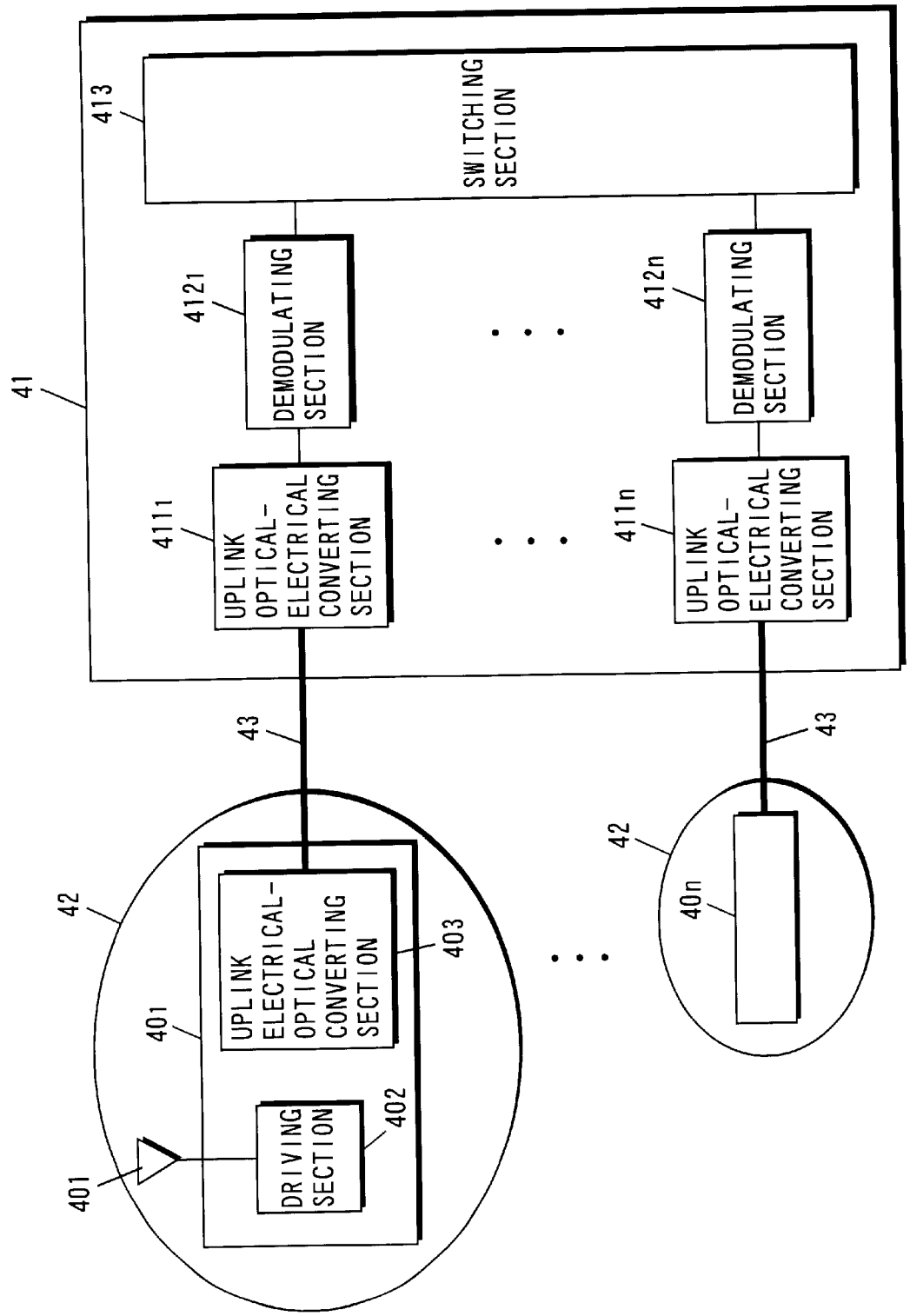
FIG. 4 is a block diagram showing an exemplary configuration of a conventional multi-point optical transmission system.

FIG. 3 is a block diagram showing the configuration of a multi-point optical transmission system according to a third embodiment of the present invention.

The system in FIG. 3 includes radio base stations $30_1$ to $30_n$ (where n is an arbitrary integer of 2 or more; radio base stations $30_1$ to $30_n$ are not shown in the drawing) and a switching station 31, and each of the radio base stations $30_1$ to $30_n$ is connected to the switching station 31 via an optical fiber 13.

Each of the radio base stations $30_1$ to $30_n$ includes an antenna 101, an uplink frequency converting section 102, a driving section 103, an uplink electrical-optical converting section 104, a downlink optical-electrical converting section 201, a downlink band pass filter section 202, a downlink frequency re-converting section 203, a circulator 204, and an uplink pilot signal multiplexing section 301.

The switching station 31 includes an optical multiplexing section 111, an uplink optical-electrical converting section 112, a branching section 113, uplink band pass filter sections $114_1$ to $114_n$, uplink frequency re-converting sections $115_1$ to $115_n$, demodulating sections $116_1$ to $116_n$, a switching section 117, modulating sections $211_1$ to $211_n$, downlink frequency converting sections $212_1$ to $212_n$, a multiplexing section 213, a driving section 214, a downlink frequency converting sections 215, an optical branching section 216, and a downlink pilot signal multiplexing section 311.

Specifically, in the system in FIG. 3, the respective radio base stations $20_1$ to $20_n$ further include the uplink pilot signal multiplexing section 301, and the switching station 21 further includes with the downlink pilot signal multiplexing section 311 compared to the system in FIG. 2 (Note that uplink components are not shown in FIG. 2).

The uplink pilot multiplexing section 301 multiplexes an uplink pilot signal into an uplink radio signal. The uplink pilot signals to be multiplexed are varied in frequency according to the radio base stations $30_1$ to $30_n$. The reason for the uplink radio signal having each different frequency is to help the switching station 31 identify which uplink pilot signal is outputted from which radio base station $30_1$ to $30_n$.

Unlike the branching section 113 in FIG. 2, the branching section 113 in FIG. 3 branches an electrical signal into n+1 signals. The downlink pilot signal multiplexing section 311 multiplexes a downlink pilot signal into a downlink radio signal. When multiplexing, the downlink pilot signal multiplexing section 311 examines one of the electrical signals obtained after branching by the branching section 113 so as to measure power of each uplink pilot signal outputted from the radio base stations $30_1$ to $30_n$, and then compares the measured value and a predetermined reference value so as to provide the difference thereof as a modulation component to the respective downlink pilot signals to be multiplexed.

The downlink band pass filter section 202 further extracts a downlink pilot signal from the electrical signal in addition to the tasks performed in the downlink band pass filter section 202 in FIG. 2 (refer to a second embodiment). The driving section 103, in addition to the tasks performed in the driving section 103 in FIG. 2, further adjusts power of a bias to be applied in accordance with the information provided to the downlink pilot signal extracted by the downlink band pass filter section 202 so that each power of the uplink pilot signals at the time of reaching the switching station 31 coincides with the reference value.

Hereinafter, the operation whereby the system in FIG. 3 performs multi-point optical transmission on a plurality of uplink radio signals outputted from the radio base stations $30_1$ to $30_n$ to the switching station 31, and at the same time performs multi-point optical transmission on a plurality of downlink radio signals outputted from the switching station 31 to the radio base stations $30_1$ to $30_n$. Note-that the basic manners for multi-point optical transmission on a plurality of uplink radio signals from the base radio stations $30_1$ to $30_n$ to the switching station 31, and on a plurality of downlink radio signals outputted from the switching station 31 to the radio base stations $30_1$ to $30_n$ are similar to the respective manners in the system in FIG. 2. Therefore, further description of those manners is omitted but any difference between the two systems will be described in detail.

The system in FIG. 3 is differed from the one in FIG. 2 in the following two points.

The first difference is that, in the system in FIG. 3, the uplink pilot signal multiplexing section 301 multiplexes an uplink pilot signal on an uplink radio signal, and the downlink pilot signal multiplexing section 311 multiplexes a downlink pilot signal on a downlink radio signal.

In this manner, an amount of noise and distortion occurs in an optical transmission system is reduced. This is because a spectrum of the radio signal will be enlarged by multiplexing the pilot signal on the radio signal. Note if a light source which is capable of outputting an optical signal having a wider-band spectrum substitutes as the uplink electrical-optical converting section 104 and the downlink electrical-optical converting section 215, the pilot signal is not necessarily multiplexed on the radio signal.

The second difference is that power of each pilot signal outputted from the radio base stations $30_1$ to $30_n$ is monitored in the switching station 31, and the monitored value is fed back to the radio base stations $30_1$ to $30_n$ with the downlink pilot signal. The radio base stations $30_1$ to $30_n$ adjust power of a bias to be applied to an uplink radio signal in accordance with the fed-back monitored value so that the power of the uplink pilot signal at the time of reaching the switching station 31 coincides with the predetermined reference value.

In this manner, the uplink radio signals will be equal in power to be sent to the demodulating sections $116_1$ to $116_n$. As a result, noise and distortion will be prevented from occurring only to an uplink radio signal outputted from a particular radio base station, and transmission characteristics in the system is accordingly improved.

Specifically, the system in FIG. 3 not only reduces an amount of noise and distortion occurred in an optical transmission system by multiplexing a pilot signal on a radio signal but prevents noise and distortion from occurring only to an uplink signal outputted from a particular radio base station by performing feedback control with the pilot signal so as to equalize power of the uplink radio signals to be sent to the demodulating sections $116_1$ to $116_n$.

Furthermore, in connection with the aforementioned second difference, each driving section 103 in this embodiment adjusts power of a bias to be applied to an uplink radio signal so as to coincide power of each uplink pilot signal at the time of reaching the switching station 31 with the reference value. However, the uplink electrical-optical converting section 104 may adjust an optical modulation level of the optical signal in place of the respective driving sections 103.

In that case, however, if each optical modulation level of the optical signals obtained by the conversion subjected by the uplink electrical-optical converting sections 104 is different from one another after the adjustment, each intensity of the optical signals to be transmitted to the uplink optical-electrical converting section 112 may also be different from one another. Therefore, a noise-to-noise (power thereof) variation may be expected after the electrical-optical conversion, which is occurred due to a noise with a relative intensity contained in the optical signals respectively outputted from the electrical-optical converting sections 104. Whereas, if the optical signals to be transmitted to the uplink optical-electrical converting section 112 are equal in intensity, the amount of the noise will be minimum. Accordingly, if the optical modulation level of the optical signals is adjusted in the above manner, the transmission characteristic of the system will be degraded compared to best condition.

As will be known from the above, the transmission characteristic will be preferably improved if, when the optical signals outputted from the respective uplink electrical-optical converting sections 104 are received by the uplink optical-electrical converting section 112, the respective driving sections 10 adjust power of a bias to be applied to the uplink radio signal so as to equalize the power of the optical signals before the respective uplink electrical-optical converting sections 104 adjust the optical modulation levels of the optical signals to be transmitted to equalize with one another.

While the invention has been described in detail, the foregoing description is in all aspects illustrative and not restrictive. It is understood that numerous other modifications and variations can be devised without departing from the scope of the invention.

What is claimed is:

1. A multi-point optical transmission system for optically transmitting code-division multiplex signals from a plurality of slave stations to a master station, said slave stations having each varied carrier frequency assigned, each of said slave stations comprising:

frequency conversion means for subjecting each code-division multiplex signal having a predetermined frequency to be transmitted to said master station to frequency conversion to equalize the predetermined frequency thereof with the carrier frequency assigned to one own station;

drive means for applying a bias to a signal obtained after the conversion by said frequency conversion means; and electrical-optical conversion means for converting an electrical signal obtained through the bias applied by said drive means into an optical signal whose intensity is modulated by the electrical signal, and said master station comprising:

optical multiplex means for multiplexing optical signals obtained after conversion by said electrical-optical conversion means;

optical-electrical conversion means for converting an optical signal obtained after multiplexing by said optical multiplex means into an electrical signal;

band pass filter means for extracting a signal equal in frequency to the carrier frequency assigned to each of said slave stations from the electrical signal obtained after conversion by said optical-electrical conversion means; and frequency re-conversion means for subjecting each signal extracted by said band pass filter means to frequency re-conversion to equalize each frequency thereof with said predetermined frequency.

2. The multi-point optical transmission system according to claim 1, wherein each of said slave stations has varied downlink carrier frequency further assigned, said master station further comprises:

downlink frequency conversion means for subjecting each downlink signal having another predetermined frequency to be transmitted to said slave stations to frequency conversion to equalize the other predetermined frequency thereof with the downlink carrier frequency assigned to each of the slave station;

multiplex means for multiplexing downlink signals obtained after the conversion by said downlink frequency conversion means;

downlink drive means for applying a bias to a signal obtained after multiplexing by said multiplex means;

downlink electrical-optical conversion means for converting an electrical signal obtained through the bias applied by said downlink drive means into an optical signal whose intensity is modulated by the signal; and optical branch means for branching the optical signal obtained after conversion by said downlink electrical-optical conversion means, and each of said slave stations further comprises:

downlink optical-electrical conversion means for converting one of a plurality of optical signals obtained after branching by said optical branch means into an electrical signal;

downlink band pass filter means for extracting a signal equal in frequency to a downlink carrier frequency assigned to the own station from the electrical signal obtained after conversion by said downlink optical-electrical conversion means; and downlink frequency re-conversion means for subjecting the downlink signal extracted by said downlink band pass filter means to frequency re-conversion to equalize a frequency thereof with said other predetermined frequency.

3. The multi-point optical transmission system according to claim 2, wherein each of said slave stations has varied pilot signal frequency further assigned, and further comprises pilot signal multiplex means for multiplexing a pilot signal having a pilot signal frequency assigned to the own station on a code-division multiplex signal to be transmitted to said master station, said master station further comprises downlink pilot signal multiplex means for multiplexing a downlink pilot signal on each of downlink signals to be transmitted to said slave stations, said downlink pilot signal multiplex means examines the electrical signal obtained after conversion by said optical-electrical conversion means to measure power of said pilot signal, and then generates control information indicating a difference between a measured value and a predetermined threshold to apply the same as a modulation component to said downlink pilot signal to be multiplexed, said downlink band pass filter means further extracts the downlink pilot signal from the electrical signal obtained after the conversion by said downlink optical-electrical conversion means, and in accordance with said control information supplied to the downlink pilot signal extracted by said downlink band pass filter means, said drive means adjusts power of a bias to be applied so that power of said code-division multiplex signal at time of reaching said master station are equalized.

4. The multi-point optical transmission system according to claim 3, wherein when converting the electrical signal into the optical signal, said electrical-optical conversion means adjusts each optical modulation level of the optical signal to equalize the same.

5. The multi-point optical transmission system according to claim 3, wherein each of said code-division multiplex signals is a signal into which a plurality of radio signals transmitted from a mobile station in each cell of said slave stations are code-division-multiplexed, each of said downlink signals is a signal into which a plurality of radio signals to be transmitted to the mobile station in said cell are multiplexed, and each of said slave stations further comprises:

an antenna for transmitting and receiving the radio signals to and from the mobile station located in one own cell; and a circulator for supplying an output from said antenna to said frequency conversion means and an output from said downlink frequency re-conversion means to said antenna.

* * * * *